P. COATS.
Still Condenser.
No. 77,718.  Patented May 12, 1868.
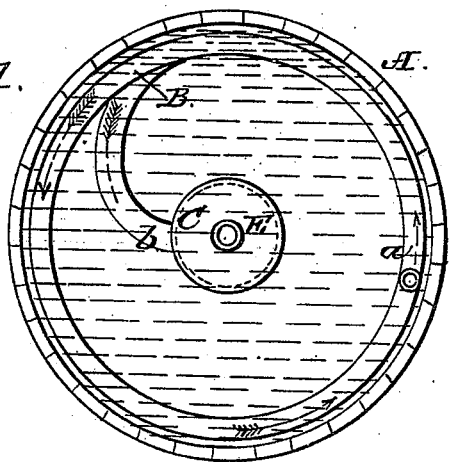
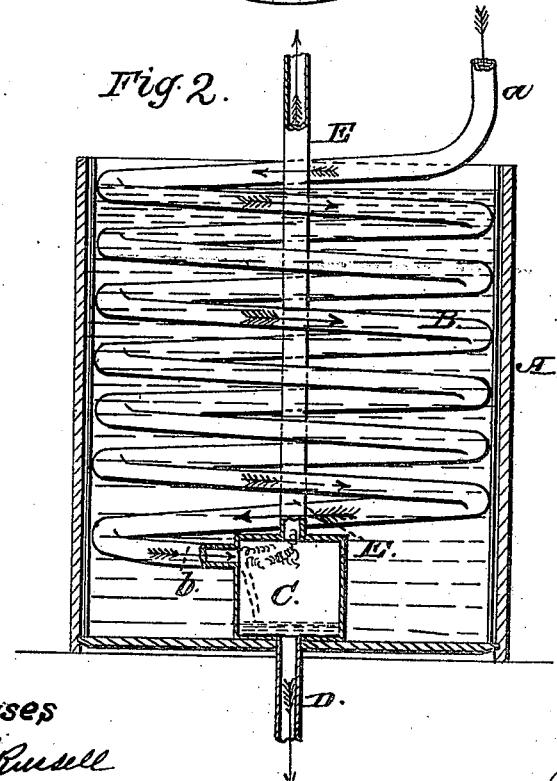
Witnesses
Samuel R Russell
C. L. Fisher
Inventor
Palser Coats

United States Patent Office.

PAXSON COATS, OF CINCINNATI, OHIO

Letters Patent No. 77,718, dated May 12, 1868.

IMPROVEMENT IN CONDENSERS FOR SPIRIT-STILLS.

*The Schedule referred to in these Letters Patent and making part of the same.*

TO ALL WHOM IT MAY CONCERN:

Be it known that I, PAXSON COATS, of Cincinnati, in the county of Hamilton, and State of Ohio, have invented a new and useful Improvement in Alcohol-Condensing Worms, of which the following is a full and clear description, reference being had to the accompanying drawings, making part of this specification.

The nature of my invention consists in constructing within the vat, which is kept constantly full of water, a worm, terminating in a reservoir located in the bottom of the vat. From the top face of said reservoir is erected the vapor-discharge pipe, and from the bottom face of the reservoir a fluid-discharge pipe is pendent, through which the condensed vapors are conveyed to the still.

In the drawings—

Figure 1 represents a view in plan of my improved alcohol-condensing worm.

Figure 2 is a sectional elevation of the same.

A is the vat or tub, generally cylindrical in form. B is the worm, being a helical pipe, and has its upper or exterior end, $a$, connected with the "column." The lower or interior end, $b$, of the worm is entered into the side of the reservoir C, near the top. The reservoir C rests upon the bottom of the vat A. Out of and from the bottom of the reservoir C extends downward the fluid-discharge pipe D. Out of the top of the reservoir C, extending upward, is the vapor-discharge pipe E.

The "wash" having been rectified in the "analyzer" or "churn," disengages its more volatile principle, the alcohol, which, in a vaporous state, passes over into the condensing-worm B, through the upper or exterior end $a$. If the water-bath in the vat A, surrounding the worm B, is maintained, by a constant influx of cold water, at a certain temperature, only the alcoholic vapor corresponding to that temperature will pass over; the rest will return to the still. When the temperature of the water in the vat A is at 144° Fahrenheit, the spirituous vapor which passes over will contain about ninety per cent. of absolute alcohol. The condensation decreases in intensity as the vapor descends through the worm B, being least when it enters the reservoir C, into the bottom of which the low-wines drop, and finally pass out by the fluid-discharge pipe D, to be redistilled, while the purer spirit, in a vaporous state, ascends through the vapor-discharge pipe E, and passes into a second condenser. A number of the condensing-worms may be used to obtain absolute alcohol.

A saving of fifty per cent. is had by the construction herein described over the condensers now in use, and a greater degree of certainty as to the results looked for, the condensation being gradual from the first entrance of the vapors through the entire length of the worm.

What I claim as new, and desire to secure by Letters Patent, is—

The worm B, having its lower end, $b$, terminating in the reservoir C, from which extend the pipes E and D, the one up and the other down, in combination with the vat A, when the same are constructed and arranged in the manner substantially as and for the purpose specified.

PAXSON COATS.

Witnesses:
C. L. FISHER,
SAMUEL R. RUSSELL.